United States Patent
Bennett

(10) Patent No.: US 10,967,604 B1
(45) Date of Patent: Apr. 6, 2021

(54) WATER BASIN CONSTRUCTION METHOD

(71) Applicant: Walter Judson Bennett, Mechanicsville, VA (US)

(72) Inventor: Walter Judson Bennett, Mechanicsville, VA (US)

(*) Notice: Subject to any disclaimer, the term of this patent is extended or adjusted under 35 U.S.C. 154(b) by 0 days.

(21) Appl. No.: 16/873,028

(22) Filed: Jan. 17, 2020

(51) Int. Cl.
| | |
|---|---|
| *B65G 5/00* | (2006.01) |
| *E04H 4/04* | (2006.01) |
| *B32B 5/02* | (2006.01) |
| *B32B 13/14* | (2006.01) |
| *B32B 27/12* | (2006.01) |
| *B32B 5/22* | (2006.01) |
| *E02D 31/00* | (2006.01) |
| *B32B 27/18* | (2006.01) |
| *E04H 4/00* | (2006.01) |

(52) U.S. Cl.
CPC .............. *B32B 5/022* (2013.01); *B32B 5/22* (2013.01); *B32B 13/14* (2013.01); *B32B 27/12* (2013.01); *B32B 27/18* (2013.01); *B65G 5/00* (2013.01); *E02D 31/004* (2013.01); *E04H 4/0081* (2013.01); *E04H 4/0093* (2013.01); *B32B 2307/73* (2013.01)

(58) Field of Classification Search
CPC ........... B65G 5/00; E04H 3/16; E04H 4/0081; E04H 4/0087; E04H 4/0093; E04H 4/0006; A63B 69/0093; A63B 69/125
USPC .......... 52/169.14, 169.7, 741.12; 4/491, 506; 405/55, 268, 270
See application file for complete search history.

(56) References Cited

U.S. PATENT DOCUMENTS

| | | | |
|---|---|---|---|
| 3,024,470 A | 3/1962 | Baker | |
| 3,383,863 A * | 5/1968 | Berry | G01M 3/40 405/270 |
| 3,429,085 A * | 2/1969 | Stillman, Jr. | E04H 4/00 52/169.7 |
| 3,841,041 A * | 10/1974 | Friedland | E04H 4/142 52/169.7 |
| 4,405,257 A * | 9/1983 | Nielsen | E02B 3/127 405/19 |
| 4,948,296 A * | 8/1990 | Salter | E04H 4/0081 264/256 |
| 5,056,960 A * | 10/1991 | Marienfeld | B09B 1/00 405/270 |
| 5,192,162 A | 3/1993 | McKinnon | |
| 5,344,490 A | 9/1994 | Roosen | |
| 5,662,983 A * | 9/1997 | Stark | B32B 27/06 428/117 |
| 6,317,901 B1 * | 11/2001 | Corpuel | E04H 4/00 4/487 |
| 2009/0183461 A1 | 7/2009 | Pierrot | |
| 2010/0233417 A1 | 9/2010 | Brewin | |

(Continued)

FOREIGN PATENT DOCUMENTS

| | | | | |
|---|---|---|---|---|
| FR | 2436860 | * | 4/1980 | |
| WO | WO-9322253 A1 | * | 11/1993 | C09D 175/04 |

*Primary Examiner* — Sunil Singh

(57) ABSTRACT

The present invention relates to a new construction method to build water basin bodies of water that can be used for recreational activities such as surfing, wake boarding, body boarding, water skiing, kayaking, canoeing, river surfing, lazy rivers, tubing rivers, swimming, scuba and other recreational water activities. The present invention construction method can be used in water basins, pools, lagoons, ponds, lakes, surf lakes, surf pools, reservoirs, bodies of water and rivers.

1 Claim, 3 Drawing Sheets

(56) References Cited

U.S. PATENT DOCUMENTS

| | | |
|---|---|---|
| 2011/0262733 A1 | 10/2011 | Roosen |
| 2012/0115380 A1* | 5/2012 | Hanna ................. C08L 23/0853 |
| | | 442/86 |
| 2014/0304906 A1* | 10/2014 | Bennett ..................... E02D 3/00 |
| | | 4/506 |
| 2018/0245739 A1* | 8/2018 | Vaughn ..................... F17C 3/12 |
| 2020/0246727 A1* | 8/2020 | Simonpietri ......... B01D 24/042 |

* cited by examiner

WATER BASIN CONSTRUCTION METHOD

BACKGROUND OF THE INVENTION

Although the current construction method to build water basins for recreational activities has proven general suitable. However, there are inherent deficiencies with current construction methods. The traditional construction method to build a recreational body of water is with rebar and with poured concrete or other kinds of concrete. Other kinds of concrete used are shotcrete and low-density concrete options. The cost to build recreational bodies of water under this construction method has been proven costly to developers and contractors. Also, the current construction methods of recreational bodies of water require a lot of construction preparation time and time to construct the rebar into place and then time to form the concrete. The concrete requires a lot of man hours to pour the concrete and use of a lot of construction equipment. Such as concrete pouring trucks, and man power to spread out and smooth out the concrete. The proposed solutions to improve construction methods to date have been ineffective in providing a satisfactory remedy. Therefore, it's desirable to provide a water basin construction method for contractors that are less costly and easier and less time consuming to construct. Another construction method that wake board lakes and surf pools, surf lakes use, is laying down a lake liner to create a water proof membrane. The problem with this construction method is the lake liners tear and create a break in the water proof membrane. This creates costly down times and very high repair costs to repair the lake liner.

PRIOR ART

In US Patent Application Publication 20100233417 (Brewin & Crawford), discloses an impregnated concrete cloth or fabric specifically claimed to be used in forming a cover for prefabricated shelter, to form a track way for vehicles, pedestrians or animals, to form a shelter by applying the fabric to a framework, to make form work for casting concrete, to form barriers, line tunnels, to repair or reinforce structures, to form floors, damp proof structures, to reinforce earth structures, to provide flood defenses, to repair existing pipes, including buried water pipes or to construct new pipes, to fire proof elements of new or existing structures, to form a hard surface, reduce dust hazards, and contain fuel spills for aircraft, to reinforce sandbag structures, and protect them from ultraviolet degradation and damage from the elements, to line ground works, to form a waterproof lining for the containment of water, to form permeant awnings or roof structures, to form artistic or decorations forms and to form hulls and superstructures of floating vessels such as boats or pontoons. The current invention teaches away from (Brewin & Crawford), because claims directed to an apparatus must be distinguished from the prior art in terms of structure rather then function. The current invention uses Geosynthetic Cementitious Composite Mat (GCCMS), with distinguished structure to form an artificial surfing reef in a water basin. Brewin and Crawford teach away from using their impregnated concrete cloth or fabric to create artificial surfing reefs in a water basin or any body of water.

In U.S. Pat. No. 3,024,470 (Baker) shows a liner (22) of PVC cut to the size of a pool that has been laid with concrete (20) but fails to show the concrete as an impregnated concrete fabric or cloth. Baker also fails to show a non-woven fabric with a liner sandwich in between two layers of non-woven fabric and sprayed with a top coat of plastic gypsum spray to create a water proof membrane as in the current invention.

In US Patent 20090183461 (Pierrot), teaches of including a geotextile material (10) in a pool to further protect a water tight membrane or liner (Par. 32). In Pierrot teaches of "protection" of the liner but the geotextile material does not teach of a function of water proofing or creating a water proof membrane as in the current invention.

In U.S. Pat. No. 5,192,162 (McKinnon), fails to show applying a plastic gypsum coating over non-woven geotextile fabric with a liner sandwich in between. (Mckinnon) teaches in claim #3, a fiber glass coating sprayed over top of cement to create a water proof lining.

In U.S. Pat. No. 5,344,490A and U.S. patent Ser. No. 08/110,920 (Roosen), teaches of creating a plasticized gypsum composition. However, fails to teach of using plasticized gypsum composition over top of non-woven geotextile fabric or impregnated concrete cloth to create a water proof membrane in a water basin or body of water to be used for recreational activities or surfing.

SUMMARY OF THE INVENTION

Method for providing a more efficient way to construct a body of water for recreational activities are disclosed. The benefits include a less costly way to construct and build a water basin. The construction methods are more efficient, time saving and less consuming way to build a water basin for recreational water activities.

The water basin body of water is first excavated, and the dirt removed from the water basin, by using excavation equipment and machines. The water basin can also be used as a surfing recreational body of water. The dirt on the bottom of the surf lake or surf pool is then shaped with different slopes and contours (Bathymetry), to create artificial surfing reefs, which create different surfing breaks. After shaping the bottom of the surf lake, the next step is to then create a way to shape and make the artificial surfing reefs in the surf lake. Just shaping the existing dirt into an artificial reef works, but over time the ground will settle and the artificial reef will eventually crumble and break apart. The settling or moisture in the dirt will break down the integrity of the artificial surfing reef shape over time. Therefore, you need a way to ensure that the artificial surfing reef will not break down over time. The current invention has solved this problem and has improved the way artificial surfing reefs can be created in a surfing body of water.

A Geosynthetic Cementitious Composite Mat (GCCMS), is placed over top of the contoured sloped earth bottom. The geosynthetic fabric is impregnated with Portland Cement and is then sprayed down with water and creates a hardened cementitious mat. The geosynthetic cementitious composite mat then creates a hardened shaped artificial reef structure used for creating surfing waves in the water basin. The geosynthetic cementitious composite mat is secured to the surfing water basin bottom by using a bullet anchor or an arrow anchor connected to a cable, which is secured by a round disc. The cable is then pulled through the round disc until tightened. The discs are placed over top and through the seams of the geosynthetic cementitious composite mat. The cable threads through the round disc and is pulled tight and the round disc secures the cementitious composite mat to the bottom of the surf lake. The anchors, cable and round disc anchoring method is put through the over lapping seams of the cementitious composite matt. The seams are then water proof and sealed by spraying a coating of plasticized gypsum spray over the round discs and over lapping seams. Once the cementitious mat is hydrated with water, the cement impregnated mat will be hardened to 5000 psi. Once this method and process is complete a long-lasting artificial surfing reef has been created in the surfing water basin. If any earth dirt underneath of the cement mat shall crumble or erode away, the hardened cement mat will still maintain its artificial reef shape integrity. The artificial surf lake and water basin bottom can then be further water proof by placing two layers of non-woven textile fabric with a lake liner sandwich in between. A final coating of plasticized gypsum spray, is then sprayed on top of the top layer of non-woven geo textile fabric.

DETAILED DESCRIPTION OF DRAWINGS

FIG. 1

Figure 1:
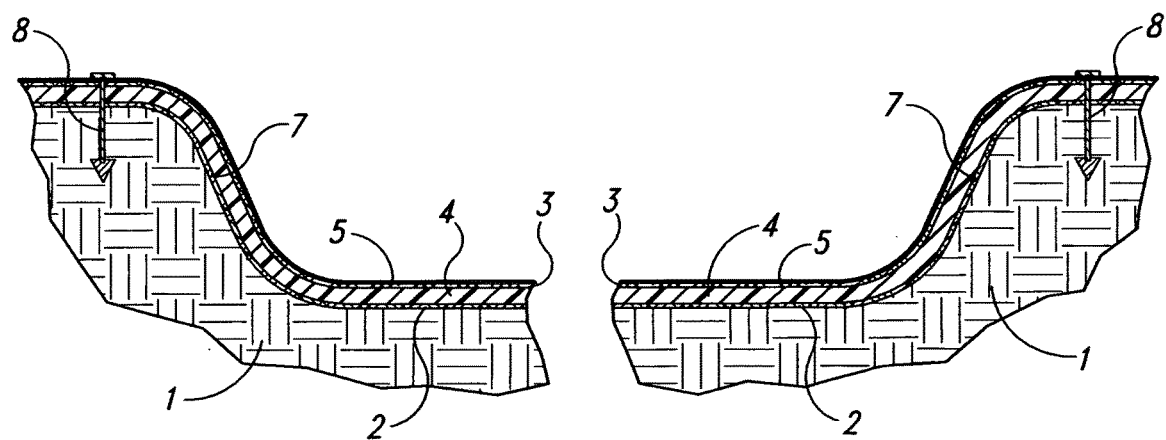
FIG. 1. is a cross sectional view of the invention.

FIG. 1 is a side cross sectional view of the water basin construction method and application. The bottom of the water basin is earth dirt 1. The bottom of the water basin 1 can be flat, sloped or contoured. Over top of the dirt bottom of the water basin 1 is a bottom layer of non-woven geo textile fabric 2 and, a top layer of non-woven geo textile fabric 3 and, a lake liner 4 between the two layers of non-woven geo textile fabric and, a coating of plasticized vegetable oil and common gypsum mixture 5 over top of the top layer of non geo textile fabric 3. The layers all put together create a water basin construction method for a recreational water basin. The entire water proof lining system is anchored over the side walls 7 by earth anchors 8.

Figure 2:
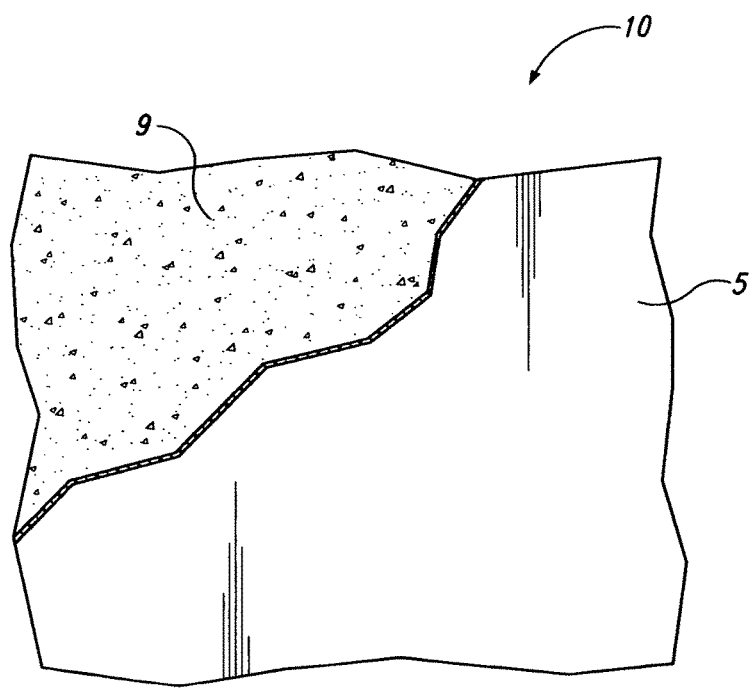
FIG. 2. is a top view of the invention.

FIG. 2:

FIG. 2 is a top down view of the water basin construction method.

A geosynthetic cementitious composite mat 9 and, a coating of plasticized vegetable oil and common gypsum mixture 5 over top of a geosynthetic cementitious composite mat 9 to form a water proof membrane 10.

Figure 3:
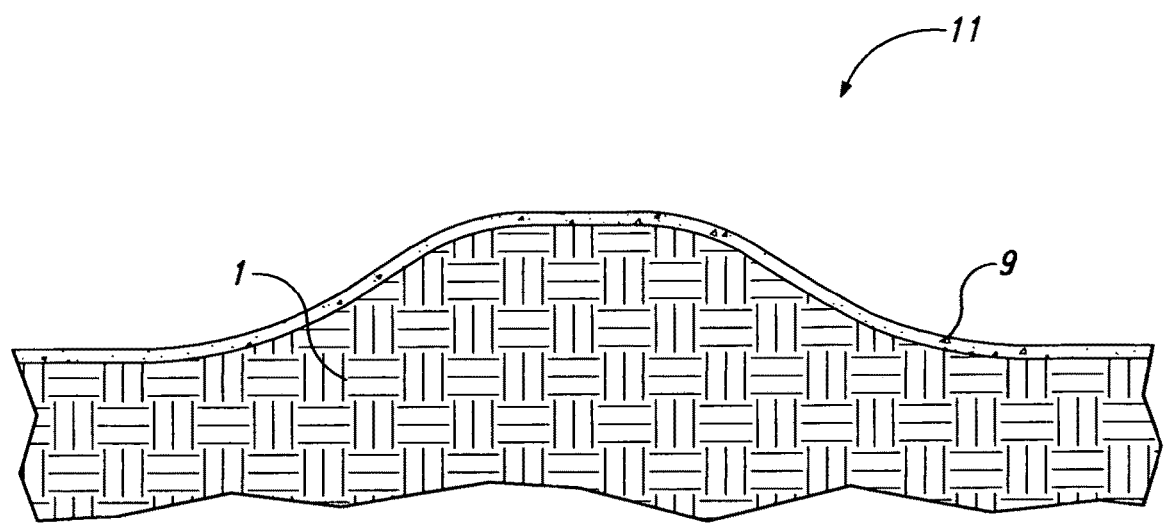
FIG. 3. is an exploded view of the invention.

FIG. 3:

FIG. 3 is a section view of each layer of the artificial surfing reef in the water basin.

A geosynthetic cementitious composite mat 9 laid over top of a contoured sloped water basin bottom 1 to form an artificial surfing reef 11.

Figure 4:
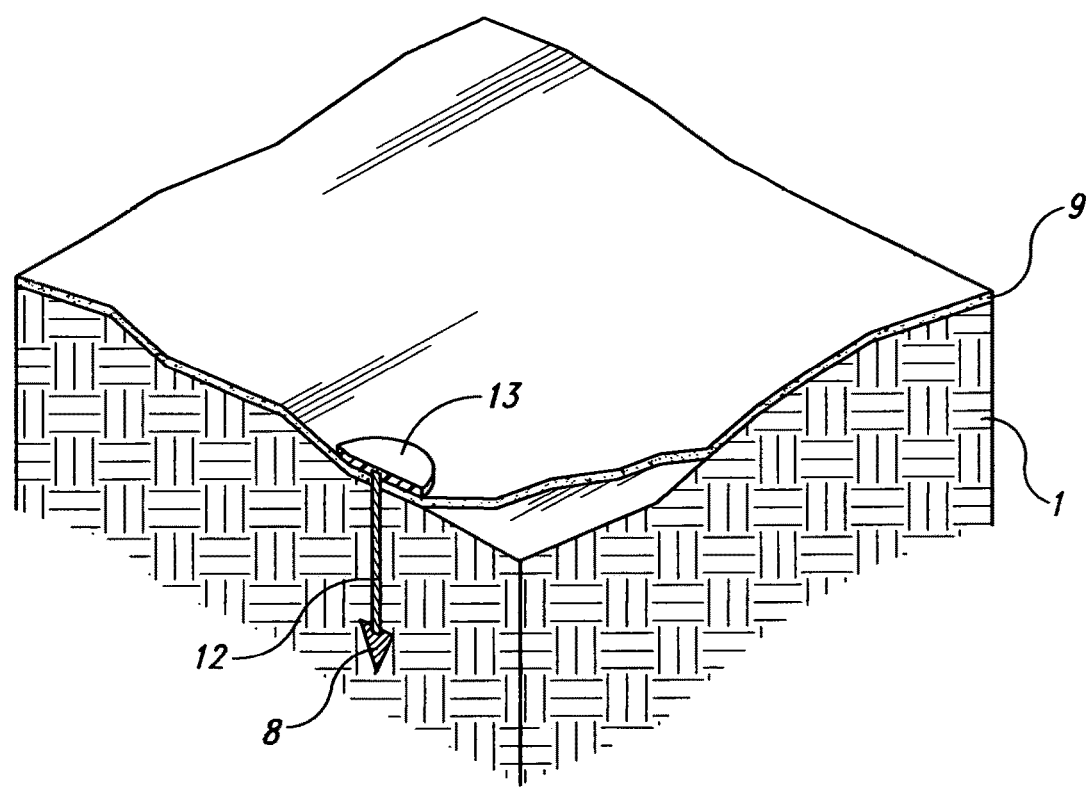
FIG. 4. is a top view of the invention.

FIG. 4. A top view of the water basin construction method.

The geosynthetic cementitious composite mat 9 that is anchored to the water basin bottom 1 by an anchor 8, cable 12 and a round disc 13.

Figure 5:
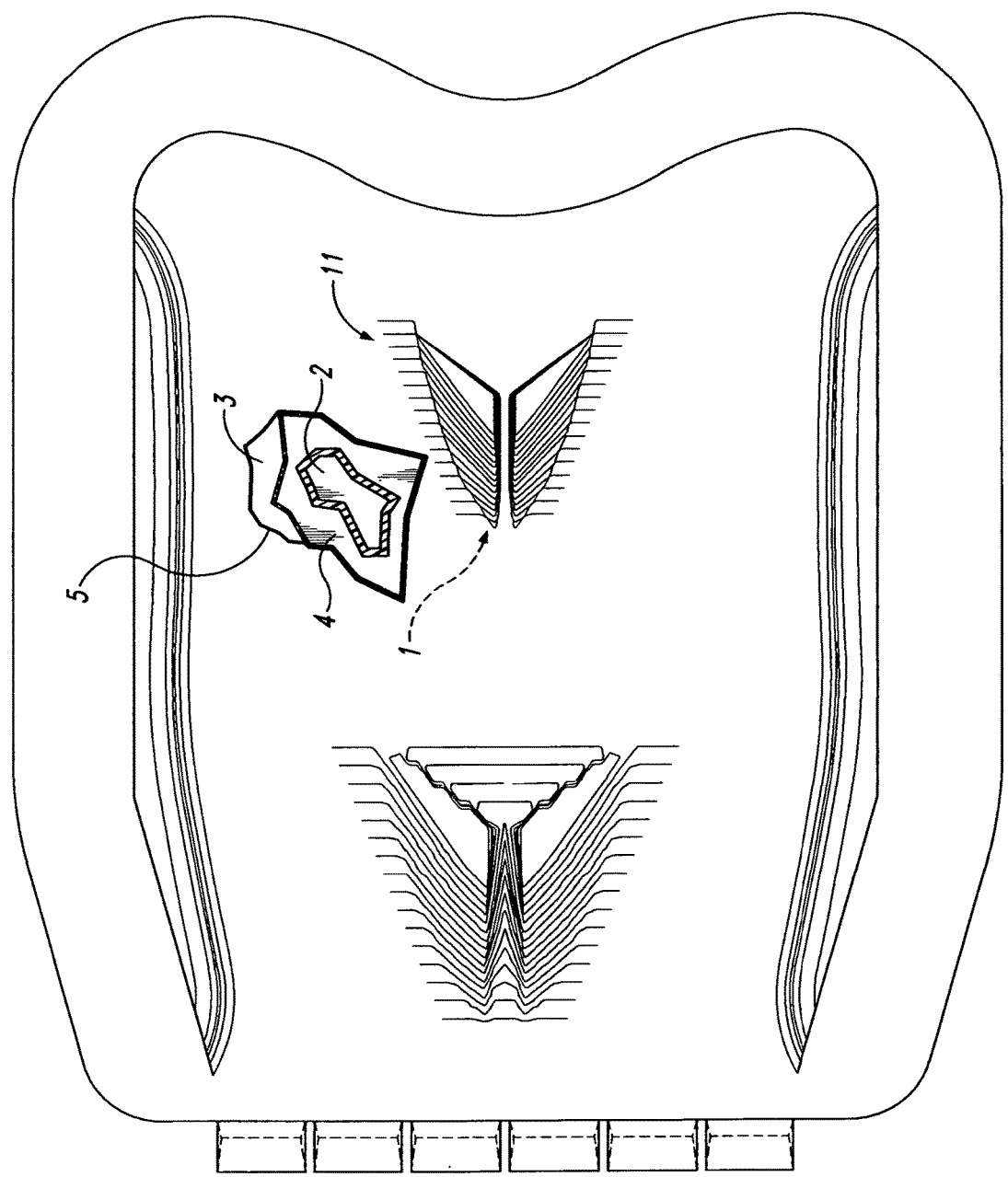
FIG. 5. Is a top view of the invention.

FIG. 5. A top view of the artificial surfing reef in the water basin.

A water basin construction method a top 3 and bottom non-woven geotextile fabric 2 and, a liner 4 between the top 3 and bottom non-woven geo textile fabric 2 and, a sprayed coating of plasticized gypsum composition 5 over the top non-woven geo textile fabric 3 and, laid over top of a contoured and sloped water basin bottom 1 to form an artificial surfing reef 11.

The invention claimed is:

1. A method for constructing a water basin for recreational water activities comprising: excavating dirt from a ground surface to form the water basin;
   shaping the dirt at the bottom of the water basin with different contours and slopes; laying a multi-layer geo textile fabric over top of the dirt shaped contours and slopes at the bottom of the water basin to form an artificial surfing reef; the multi-layer geo textile fabric comprises a bottom layer of non-woven geo textile fabric, a top layer of non-woven geo textile fabric and a liner between the top and bottom layers of non-woven geo textile fabrics;
   applying a coating of plasticized gypsum composition mixture over top of the top layer of non-woven geo textile fabric.

* * * * *